(12) United States Patent
Stiller et al.

(10) Patent No.: US 6,183,854 B1
(45) Date of Patent: Feb. 6, 2001

(54) METHOD OF MAKING A REINFORCED CARBON FOAM MATERIAL AND RELATED PRODUCT

(75) Inventors: Alfred H. Stiller; Aaron Yocum; Januz Plucinski, all of Morgantown, WV (US)

(73) Assignee: West Virginia University, Morgantown, WV (US)

( * ) Notice: Under 35 U.S.C. 154(b), the term of this patent shall be extended for 0 days.

(21) Appl. No.: 09/235,440

(22) Filed: Jan. 22, 1999

(51) Int. Cl.$^7$ ........................................................ B32B 3/00
(52) U.S. Cl. ............................................................ 428/312.2
(58) Field of Search ........................................... 428/312.2

(56) References Cited

U.S. PATENT DOCUMENTS

| | | |
|---|---|---|
| 4,025,689 | 5/1977 | Kobayashi et al. . |
| 4,029,749 | 6/1977 | Murakami . |
| 4,096,097 | 6/1978 | Yan . |
| 4,225,463 | 9/1980 | Unger et al. . |
| 4,318,824 | 3/1982 | Turner . |
| 4,487,687 | 12/1984 | Simo et al. . |
| 4,518,483 | 5/1985 | Dickakian . |

OTHER PUBLICATIONS

U.S. application No. 08/887,556, Stiller.
Wang, Reticulated Vitreous Carbon—A New Versatile Electrode Material, Electrochimica Acta, (1981), pp. 1721–1726, vol. 26, No. 12.
Donnet et al., Carbon Fiber Applications, Carbon Fibers, Marcel Decker, Inc. (1984), pp. 222–261.
Edie et al., Melt Spinning Pitch–Based Carbon Fibers, Carbon, Pergamen Press (1989), pp. 647–655, vol. 27, No. 5.
Wang, Reticulated Vitreous Carbon an Exciting New Material, ERG Energy Research and Generation, Inc., (undated), Oakland, CA.
Pekala et al., Carbon Aerogels and Xerogels, Mat. Res. Soc. Symp. Proc. (1992), pp. 3–14, vol 270.
Hager et al., Idealized Ligament Formation in Geometry in Open–Cell Foams, 21st Biennial Conference on Carbon, Conf. Proceedings, American Carbon Society, (1993), pp. 102–103, Buffalo, NY.
Mehta et al., Graphitic Carbon Foams: Processing and Characterizations, 21st Biennial Conference on Carbon, Conf. Proceedings, American Carbon Society, (1993), pp. 104–105, Buffalo, NY.
Hall et al., Graphitic Foams as Potential Structural Materials, 21st Biennial Conference on Carbon, Conf. Proceedings, American Carbon Society, (1993), pp. 100–101, Buffalo, NY.
Stiller et al., Effects of Additives on the Mechanical Properties of Graphitizable Foams, Proceedings from the 22nd Annual Conference on Ceramic, Metal and Carbon Composites, Materials and Structures, AMPTIAC, (Jan. 1998), pp. 1–10.

Primary Examiner—Edward J. Cain
(74) Attorney, Agent, or Firm—Arnold B. Silverman; Eckert Seamans Cherin & Mellott, LLC

(57) ABSTRACT

A method of making an anisotropic or isotropic carbon foam include introducing at least one reinforcing additive which may be carbon nanofibers, carbon nanotubes, chopped graphite fibers, crushed green coke, crushed calcined coke or combinations thereof during the process of manufacturing the carbon foam to enhance selected strength properties of the resultant foam. A resultant product is also disclosed.

40 Claims, No Drawings

METHOD OF MAKING A REINFORCED CARBON FOAM MATERIAL AND RELATED PRODUCT

BACKGROUND OF THE INVENTION

1. Field of the Invention

The present invention relates to a method of making a reinforced carbon foam material having enhanced strength and, more specifically, it relates to such a method which employs selected reinforcing additives which are introduced during the fabrication process. It also relates to the resulting product.

2. Description of the Prior Art

It has long been known that coal has a wide variety of beneficial uses including, for example, use as a fuel in electric utility plants, the production of coke for use in process metallurgy, and the production of a wide variety of carbon products.

In U.S. patent application Ser. No. 08/887,556, entitled "Method or Making a Carbon Foam Material and Resultant Product" filed Jul. 3, 1997 now U.S. Pat. No. 5,888,469, and owned by the assignee of the present application, detailed disclosures are provided for methods of producing anisotropic or isotropic carbon foam having a number of beneficial properties and the resultant product. The disclosure of this application is expressly incorporated herein by reference.

The carbon foam produced by the method disclosed in U.S. patent application Ser. No. 08/887,556 has substantial compressive strength which may be on the order of an excess of about 600 lb/in$^2$. It also produces a product which is relatively lightweight and possesses a controllable degree of electrical and thermal conductivity.

In spite of the foregoing known methods and resultant products, there remains a need for a method of making carbon foam and a resultant product which has certain additional desired strength characteristics.

SUMMARY OF THE INVENTION

The present invention has met the above-described needs by providing methods of making anisotropic or isotropic carbon foam material such as in accordance with U.S. Ser. No. 08/887,556 with the introduction during the method of reinforcing additives to the mix to thereby produce enhanced properties such as enhanced tensile strength and modulus.

In a preferred practice of the invention, the reinforcing addition will be carbon nanotubes, carbon nanofibers, chopped graphite fibers, crushed green coke, crushed calcined coke or combinations thereof. It is preferred that the reinforcing additives be included in an amount of about 2 to 8 weight percent of the pitch.

The product produced may be coked to devolatilize and foam, baked, calcined and graphitized, as desired.

It is an object of the present invention to provide an improved carbon foam material and a method of making the same wherein enhanced strength characteristics are provided as the result of the introduction of reinforcing additives during the making of the product.

It is a further object of the present invention to provide reinforcement wherein the reinforcing additives may consist of one or more of a specifically selected group of preferred materials.

It is another object of the present invention to provide such a system wherein known systems of making carbon foam may be employed with only minor modification for the introduction of the reinforcing additives.

It is a further object of the invention to produce a reinforced carbon foam which despite its low density has improved strength and modulus characteristics.

It is yet another object of the present invention to provide such a system wherein properties such as tensile strength, tensile modulus, compressive strength, compressive modulus, flexural strength and flexural modulus are enhanced as a result of the presence of the reinforcing additives.

It is yet another object of the invention to provide such a system wherein the reinforcing additives may be introduced into the materials employed in the method when the materials are in dry form or introduced when the materials are in wet form.

These and other objects of the invention will be more fully understood from the following detailed description of the invention.

DESCRIPTION OF THE PREFERRED EMBODIMENTS

As employed herein, the term "reinforcing additives" means carbon nanotubes, carbon nanofibers, chopped graphite fibers, crushed calcined coke, crushed green coke and combinations thereof.

The present invention contemplates enhancing certain properties of a carbon foam material through the addition of selected reinforcing additives thereto. The basic process for making the carbon foam material while preferably that disclosed in U.S. patent application Ser. No. 08/887,556 may involve other processes for making the carbon foam.

In making an anisotropic carbon foam material, one may create a coke precursor or pitch by hydrogenating and de-ashing bituminous coal followed by dissolving the hydrogenated bituminous coal having asphaltenes and oils in a solvent, separation of the asphaltenes from the oils, coking the asphaltenes by heating to devolatilize and foam the same, and cooling the carbon foam. The material may be baked, calcined and graphitized, if desired. During the method, reinforcing additives may be introduced to enhance properties such as tensile modulus, flexural modulus, compressive strength and tensile strength of the carbon foam.

Similarly, in making an isotropic carbon foam material one may create a coke precursor or pitch by de-ashing bituminous coal, dissolving the de-ashed coal having asphaltenes and oils in a solvent, separating the asphaltenes from the oils, coking the asphaltenes by heating to devolatilize and foam and cooling the carbon foam. The foam may be baked, calcined and graphitized, if desired. During the method, a reinforcing additives may be introduced.

The reinforcing additives are preferably selected from the group consisting of carbon nanotubes, carbon nanofibers, chopped graphite fibers, crushed green coke and crushed calcined coke as well as combinations of two or more of the these materials.

In one embodiment of the invention, the reinforcing materials are introduced when the process has the other materials in a dry state. In another embodiment, the reinforcing materials may be added after solvent addition. Tests have indicated that the introduction of the reinforcing additive by the wet processing technique tends to provide greater enhancement of compressive strength and retention of strength and high strain than the dry introduction process, although both produce meaningful improvements in strength characteristics.

It is preferred that the reinforcing additive be employed in the range of about 2 to 8 weight percent based on the weight of coke precursor (pitch).

The carbon nanofibers and carbon nanotubes employed in the present invention preferably have a ratio of fiber length to fiber diameter of about 2 to 3000 and preferably about 100 to 300. The carbon nanofibers and carbon nanotubes may have a diameter in the range of about 10 to 200 mm. The graphite fibers also preferably have a length to diameter of about 2 to 3000 and preferably about 100 to 300. The carbon nanofibers, carbon nanotubes and the chopped graphite fibers are preferably ground to −200 mesh prior to use.

In making the coke, the material may be baked at a temperature of about 500 to 550° C. to produce green coke. The baking may take place at a pressure of about 200–500 psig. Subsequently, the material may be calcined at about 975 to 1025° C. at one atmosphere in an inert gas. Subsequently, the calcined coke may be graphitized at a temperature of about 2600 to 3200° C.

The carbon nanotubes employed in the present invention as a reinforcing additive, may be in the form of single walled nanotubes or multiwalled nanotubes, the latter of which is generally created by applying additional graphitic layers through pyrolytic deposition. It is believed that the well ordered, highly graphitic lattice is what enables the nanotube to achieve a very high strength and modulus. It has a very high surface area to volume ratio due to its submicron diameter. The highly ordered graphitic lattice also results in nearly metallic electrical conductivity. It is generally preferred to preheat the nanofibers and nanotubes to about 200° F. for about 10 to 200 minutes to remove polyaromatic hydrocarbons (PAH).

Carbon nanotubes may be produced from catalyzed pyrolysis reactions of coal and other fossil hydrocarbon fuels.

In producing the crushed green coke, a neat extract can be produced by grinding coal to −60 mesh and dividing the sample into two portions. If desired, one portion was used for direct extraction while the other portion was retained for extraction after mild hydrogenation. The first portion may be refluxed in N-methylpyrrolidone for one hour under a nitrogen blanket at atmospheric pressure. At this condition, about 65 percent of the carbonous material will dissolve in the solvent while the remaining material containing all the inorganic material will remain insoluble. The solution may then be separated from the residue by centrifugation at 2000 g and the N-methylpyrrolidone can be removed from the solution by evaporation leaving a dry-friable pitch. This neat pitch can be heated in 100 percent reflux coke oven to produce green coke. The pitch can be heated in two stages. In the first phase, the pitch can be heated to 450° C. at a rate of 5° C. per minute. It can be maintained at this temperature for about 1.5 hours and then can be heated to 580° C. at the rate of 5° C. per minute and maintained at that temperature for about 6 hours. After the reactor cooled, the coke can be removed and crushed to −100 mesh. The coke had the appearance of typical metallurgical coke. To convert the green coke to calcined coke, prior to crushing, the green coke is heated under an inert atmosphere at a rate of 0.1 degrees/minute to 50 degrees/minute to a final temperature of about 975–1025 C.

One method of foam fabrication employed in the present invention involves the extraction of organic material from coal using a class of organic solvents known generically as dipolar aprotic solvents. These solvents have the ability to solubilize much of the organic carbonaceous material in coal. An advantage of this approach is that only organic material is soluble in the solvent and inorganic mineral matter is not. The solvent extraction procedure may be performed as a batch process at about 200° C. and one atmosphere of pressure which is the normal boiling point of one of the primary solvents. After a very short treatment of the coal by the solvent, considerable amounts of organic material originally present in the coal were dissolved in the solvent. An undissolved fraction which contained essentially all of the mineral matter present in the raw coal settled to the bottom of the reactor vessel as a solid or centrifugation with filtration material. The solution was separated from the solid material by simple filtration leaving behind in the filter the solid undissolved material, i.e., the residue. Once separated, the dissolved organic material was recovered from solution by evaporating the solvent. The purified coal extract was recovered as a friable glass-like solid. The important properties of the extract are that it was composed of pure organic material derived from the original coal and contained no inorganic sulfur species and little or no mineral matter. Upon analysis of the extract, typical ash levels of less than 0.1 percent were routinely obtained and levels as low as 0.01 percent could be achieved with additional processing. Yields up to about 50 percent of the weight of the original coal can be realized. The process works particularly well with bituminous coals.

The material may have a density which is varied depending upon the pressure and temperature properties, as well as the specific process employed to manufacture the foam, but may, for example, have a density of about 0.2 gm/cc to 1.5 gm/cc.

If desired, two or more reinforcing additives may be combined.

It will be appreciated that the present invention may be employed to create a carbon foam product with predetermined strength. It is not always the objective to maximize strength. For example, a component designed to fail at a predetermined compressive impact load may be created by control over the method of making the carbon foam including providing an appropriate type and amount of reinforcing additives. Such a product could be usable in vehicles as well as other applications.

It will be appreciated, therefore, that the present invention provides an improved method for enhancing or otherwise adjusting the strength properties of carbon foam material. This is accomplished through the use of specific preferred reinforcing additives which are introduced on either a dry or wet basis into the process of manufacturing the material. All of this may be accomplished in a manner which is consistent with various desired means of manufacturing carbon foam.

The enhanced strength material, on the basis of experimental evaluation, has enhanced compressive strength, compressive modulus, tensile strength, tensile modulus and flexural strength and flexural modulus.

It will be appreciated that the relatively low density high strength materials of the present invention will have numerous end use applications dependent upon the specific needs of an end use environment. Uses in aerospace, vehicles, military applications, applications requiring high impact resistance, as well as numerous other advantageous uses will become apparent to those skilled in the art.

Whereas particular embodiments of the invention have been described herein for purposes of illustration, it will be evident to those skilled in the art that numerous variations of the details may be made without departing from the invention as defined in the appended claims.

What is claimed is:

1. A method of making an anisotropic carbon foam material comprising:

creating a coke precursor by hydrogenating and de-ashing bituminous coal, dissolving said hydrogenated bituminous coal having asphaltenes and oils in a solvent, separating said asphaltenes from said oils, coking said asphaltenes by heating to devolatilize and foam said asphaltenes, cooling said carbon foam, and during said method introducing a reinforcing additive.

2. The method of claim 1 including employing carbon nanotubes as said reinforcing additive.

3. The method of claim 2 including employing carbon nanotubes having a ratio of fiber length to fiber diameter of about 2 to 3000.

4. The method of claim 1 including employing chopped graphite fibers as said reinforcing additive.

5. The method of claim 1 including employing crushed calcined coke as said reinforcing additive.

6. The method of claim 1 including employing said reinforcing additive in the range of about 2 to 8 weight percent based on the weight of said coke precursor.

7. The method of claim 1 including after said coking baking said material at a temperature of about 500–550° C.

8. The method of claim 7 including effecting said baking at a pressure of about 200–500 psig.

9. The method of claim 1 including said reinforcing additive being introduced into said hydrogenated bituminous coal.

10. The method of claim 1 including said reinforcing additive being introduced into said coke precursor.

11. The method of claim 1 including employing as said reinforcing additive a mixture containing at least two materials selected from the group consisting of carbon nanotubes, carbon nanofibers, chopped graphite fibers, crushed green coke and crushed calcined coke.

12. The method of claim 1 including graphitizing said carbon foam.

13. The method of claim 1 including employing carbon nanofibers as said reinforcing additive.

14. The method of claim 1 including employing crushed green coke as said reinforcing additive.

15. The method of claim 7 including subsequent to said baking, calcining said material at about 975 to 1025° C. at a rate of about 0.1 to 50 degrees/minute.

16. The method of claim 15 including effecting said calcining generally at about one atmosphere.

17. The method of claim 15 including subsequent to said calcining, graphitizing said material.

18. A method of making an isotropic carbon foam material comprising
creating a coke precursor by de-ashing bituminous coal,
dissolving said de-ashed coal having asphaltenes and oils in a solvent,
separating said asphaltenes from said oils,
coking said asphaltenes by heating to devolatilize and foam said asphaltenes,
cooling said carbon foam, and
during said method introducing a reinforcing additive.

19. The method of claim 18 including employing carbon nanotubes as said reinforcing additive.

20. The method of claim 19 including employing carbon nanotubes having a ratio of fiber length to fiber diameter of about 2 to 3000.

21. The method of claim 19 including employing chopped graphite fibers as said reinforcing additive.

22. The method of claim 19 including employing crushed calcined coke as said reinforcing additive.

23. The method of claim 19 including employing said reinforcing additive in the range of about 2 to 8 weight percent based on the weight of said coke precursor.

24. The method of claim 19 including after said coking baking said material at a temperature of about 500–550° C.

25. The method of claim 24 including effecting said baking at a pressure of about 200–500 psig.

26. The method of claim 19 including said reinforcing additive being introduced into said coke precursor.

27. The method of claim 26 including employing as said reinforcing additive a mixture containing at least two materials selected from the group consisting of carbon nanotubes, carbon nanofibers, chopped graphite fibers, crushed green coke and crushed calcined coke.

28. The method of claim 19 including after said coking but prior to said graphitizing calcining said carbon foam.

29. The method of claim 19 including employing carbon nanofibers as said reinforcing additive.

30. The method of claim 19 including employing crushed green coke as said reinforcing additive.

31. The method of claim 28 including effecting said calcining about 975 to 1025° C.

32. A coal derived carbon foam material comprising a body portion having a plurality of voids of generally uniform size therein, and
reinforcing additives dispersed through said body portion.

33. The coal derived carbon foam material of claim 32 including said body portion being anisotropic.

34. The coal derived carbon foam material of claim 32 including said body portion being isotropic.

35. The coal derived carbon foam material of claim 32 including said reinforcing additive being carbon nanotubes.

36. The coal derived carbon foam material of claim 32 including said reinforcing additive being chopped graphite fibers.

37. The coal derived carbon foam material of claim 32 including said reinforcing additive being crushed calcined coke.

38. The coal derived carbon foam material of claim 32 including said carbon foam being graphitized carbon foam.

39. The coal derived carbon foam material of claim 32 including said reinforcing additive being carbon nanofibers.

40. The coal derived carbon foam material of claim 32 including said reinforced additive being crushed green coke.

* * * * *

UNITED STATES PATENT AND TRADEMARK OFFICE
CERTIFICATE OF CORRECTION

PATENT NO. : 6,183,854 B1
DATED : February 6, 2001
INVENTOR(S) : Alfred H. Stiller et al.

It is certified that error appears in the above-identified patent and that said Letters Patent is hereby corrected as shown below:

Column 1,
Line 20, "or" should read -- of --.

Signed and Sealed this

First Day of January, 2002

Attest:

Attesting Officer

JAMES E. ROGAN
Director of the United States Patent and Trademark Office